United States Patent [19]
Shimosaka et al.

[11] Patent Number: 5,966,213
[45] Date of Patent: Oct. 12, 1999

[54] METHOD AND APPARATUS FOR MEASURING THE SURFACE SHAPE OF A GOLF BALL

[75] Inventors: Hirotaka Shimosaka; Keisuke Ihara, both of Saitama, Japan

[73] Assignee: Bridgestone Sports Co., Ltd., Tokyo, Japan

[21] Appl. No.: 09/114,170

[22] Filed: Jul. 13, 1998

[30] Foreign Application Priority Data

Jul. 11, 1997 [JP] Japan .................................... 9-186404

[51] Int. Cl.⁶ .................................................. G01B 11/30
[52] U.S. Cl. ............................................................ 356/376
[58] Field of Search ................................... 356/376, 371, 356/426

[56] References Cited

U.S. PATENT DOCUMENTS

| | | | |
|---|---|---|---|
| 4,017,188 | 4/1977 | Sawatari .................................. | 356/376 |
| 4,088,408 | 5/1978 | Burcher et al. .......................... | 356/376 |
| 4,289,400 | 9/1981 | Kubota et al. ........................... | 356/371 |
| 5,179,425 | 1/1993 | Reinsch et al. .......................... | 356/371 |
| 5,239,366 | 8/1993 | Kittell et al. ............................ | 356/376 |
| 5,467,192 | 11/1995 | Manning ................................. | 356/371 |
| 5,703,687 | 12/1997 | Kumagai et al. ........................ | 356/426 |

*Primary Examiner*—Richard A. Rosenberger
*Attorney, Agent, or Firm*—Sughrue, Mion, Zinn, Macpeak & Seas, PLLC

[57] ABSTRACT

There are disclosed a method and an apparatus for measuring the surface shape of a golf ball. A positional relationship detection process is performed by radiating laser light from the light generation section onto the surface of the golf ball at a predetermined position and receiving, through use of the light reception section, reflection light of the laser light reflected at the predetermined position on the surface of the golf ball in order to detect the positional relationship among the light generation section, the laser light radiated position on the surface of the golf ball, and the light reception section. The positional relationship detection process is repeated at a plurality of positions on the surface of the golf ball, and variation in the relative radial position of the surface of the golf ball is determined based on a plurality of positional relationships thus obtained. The surface shape of the golf ball, e.g., the surface shape of dimples, can be measured precisely.

9 Claims, 5 Drawing Sheets

METHOD AND APPARATUS FOR MEASURING THE SURFACE SHAPE OF A GOLF BALL

BACKGROUND OF THE INVENTION

1. Field of the Invention

The present invention relates to a method and apparatus for precisely measuring the surface shape of a golf ball, e.g., the shapes of dimples.

2. Related Art

In order to improve the travel performance of a golf ball, a large number of dimples—which may be of a single kind of shape or of plural kinds of shapes—are provided on the surface of the golf ball. In general, such dimples are formed during a molding process in which a molding material is injected into the cavity of a mold that has on its cavity wall surface protrusions corresponding to the dimples, and the injected molding material is then hardened.

Although to the casual observer the dimples of a golf ball appear uniform, the shapes of the dimples are affected by the machining accuracy of a mold, wear of the cavity wall surface of the mold due to prolonged use, distortion of molding material due to hardening, and polishing and painting after molding of the ball. Therefore, measurement must be performed so as to check whether the dimples have been formed into a target or desired shape.

Conventionally, the shapes of dimples have been measured as follows. Light from a lamp such as an incandescent lamp is passed through a slit to obtain a light beam having the cross section of a line (hereinafter called "a line-shaped light"), which is then radiated onto a dimple of a golf ball placed on a base. The image of the irradiated portion is captured through use a camera, and the depth of the dimple is measured from the thus-obtained image. More specifically, when the above-described line-shaped light is radiated onto a dimple at, for example, the central portion thereof (i.e., along the diametrical line), the irradiated portion is displayed on, for example, a monitor screen as having a concave cross-sectional shape. The displayed cross section is then divided at predetermined intervals from one edge to the other edge, and the depth of the dimple is measured at each of the divided portions.

However, when light emitted from a lamp and passed through a slit is radiated as a line-shaped light onto a dimple of a golf ball, the light scatters on the dimple. Therefore, the method of measuring the shapes of dimples based on an image obtained through use of line-shaped light unavoidably decreases the measurement accuracy, and therefore is not suitable for measurement of the shapes of dimples of a golf ball.

SUMMARY OF THE INVENTION

The present invention has been achieved in view of the foregoing problem, and an object of the present invention is to provide a method and apparatus capable of precisely measuring the surface shape of a golf ball.

To achieve the above object, the present invention provides a method of measuring the surface shape of a golf ball, comprising the steps of:

(a) radiating laser light from a light generation section onto a surface of a golf ball at a predetermined position;

(b) receiving, through use of a light reception section, reflection light of the laser light reflected at the predetermined position on the surface of the golf ball;

(c) detecting the positional relationship among the light generation section, the laser light radiated position on the surface of the golf ball, and the light reception section;

(d) repeating the steps (a)–(c), as a positional relationship detection process, at a plurality of positions on the surface of the golf ball;

(e) determining variation in the relative radial position of the surface of the golf ball based on a plurality of positional relationships thus obtained.

The present invention also provides an apparatus for measuring the surface shape of a golf ball including support means for supporting a golf ball; a light generation section for radiating laser light onto the surface of the golf ball supported on the support means; and a light reception section for receiving reflection light of the laser light reflected at the surface of the golf ball, in which a positional relationship detection process is performed by radiating laser light from the light generation section onto the surface of the golf ball at a predetermined position and receiving, through use of the light reception section, reflection light of the laser light reflected at the predetermined position on the surface of the golf ball in order to detect the positional relationship among the light generation section, the laser light radiated position on the surface of the golf ball, and the light reception section; the positional relationship detection process is repeated at a plurality of positions on the surface of the golf ball; and variation in the relative radial position of the surface of the golf ball is determined based on a plurality of positional relationships thus obtained.

In the present invention, since the positional relationship detection process is performed through use of laser light which causes a smaller amount of scattering of light at the surface of a golf ball than does light from a lamp, the positional relationship among the light generation section, the laser light radiated position on the surface of the golf ball, and the light reception section can be detected precisely. Further, in the present invention, the positional relationship detection process is performed at a plurality of positions on the surface of the golf ball, and based on the thus-precisely detected plurality of positional relationships (the positional relationships among the light generation section, the laser light radiated position on the surface of the golf ball, and the light reception section), variation in the relative radial position of the surface of the golf ball is determined. Therefore, the surface shape of the golf ball can be measured precisely.

In the positional relationship detection process there can be used, for example, an angular reflection measurement method, or a conjugate focal point measurement method, which will be described later, in order to detect the positional relationship among the light generation section, the laser light radiated position on the surface of the golf ball, and the light reception section.

No limitation is imposed on the wavelength of laser light used in the positional relationship detection process. However, laser light used in the present invention preferably has a wavelength of 100–2000 nm, more preferably, 100–1000 nm.

Further, in the present invention, in order to determine variation in the relative radial position of the surface of a dimple, the positional relationship detection process is preferably performed at 800–5000 points, more preferably 1000–2400 points, along a direction traversing the dimple. This enables precise measurement of the shape of the dimple.

In general, transparent film is formed on the surface of a golf ball through coating. The present invention enables measurement through use of both laser light reflected at the surface of the transparent film of the golf ball and laser light reflected at the surface of the cover material of the golf ball.

Therefore, the thickness of the coated film can be measured accurately through determination of variation in the relative radial position of the surface of the transparent film and variation in the relative radial position of the surface of the cover material.

According to the present invention, the surface shape of a golf ball, e.g., the surface shape of dimples, can be measured precisely.

DESCRIPTION OF THE PREFERRED EMBODIMENTS

Figure 1:
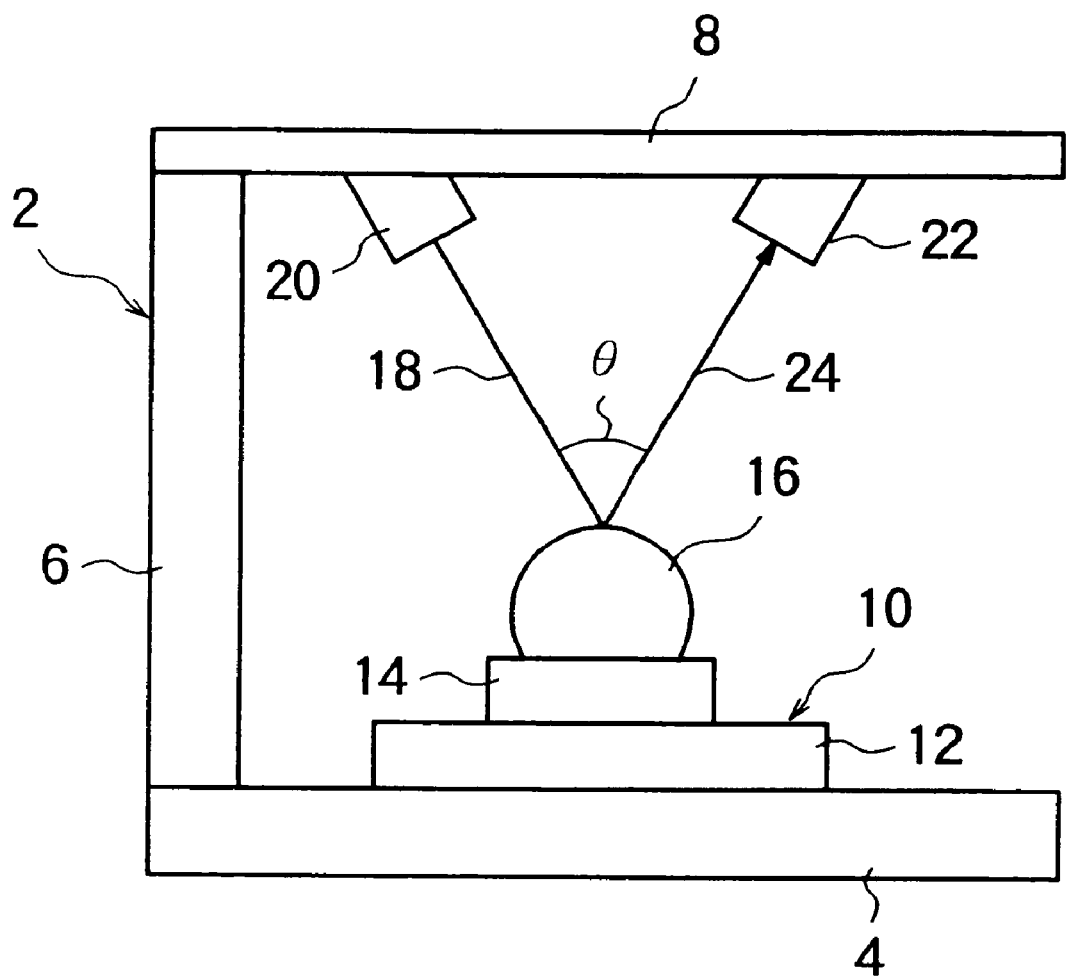
FIG. 1 is a side view of a first embodiment of an apparatus for measuring the surface shape of a golf ball according to the present invention.

First Embodiment:

FIG. 1 is a side view showing a first embodiment of an apparatus for measuring the surface shape of a golf ball according to the present invention. This apparatus utilizes an angular reflection measurement method in order to detect the positional relationship among a light generation section, a laser light radiated position on the surface of a golf ball, and a light reception section.

In FIG. 1, numeral 2 denotes a base. The base 2 includes a horizontal first frame 4, a vertical second frame 6 fixed to the rear end of the first frame 4, and a horizontal third frame 8 fixed to the upper end of the second frame 6. The third frame 8 is located directly above the first frame 4.

Support means 10 for supporting a golf ball is disposed on the first frame 4 of the base 2. The support means 10 includes a movable table 12, and a pedestal 14 fixed onto the movable table 12. Unillustrated drive means moves the movable table 12 in the left/right direction (X direction), the front/back direction (Y direction), and the vertical direction (Z direction) as viewed from the front side of the apparatus. The amounts of movement of the movable table 12 in the X, Y, and Z directions are detected by means of movement amount detection means (unillustrated). A concave portion (not illustrated) is formed on the top surface of the pedestal 14 in order to receive the lower portion of a golf ball 16. When the golf ball 16 is placed into the concave portion, the golf ball 16 is supported by means of the support means 10. In FIG. 1, dimples on the golf ball 16 are omitted.

Supported on the third frame 8 of the base 2 are a light generation section 20 and a light reception section 22. The light generation section 20 radiates laser light (a laser beam) onto the surface of the golf ball 16 supported on the support means 10. The light reception section 22 receives reflection light 24 of the laser light 18 reflected at the surface of the golf ball 16. The light generation section 20 includes a light emitting device such as a semiconductor laser, while the light reception section 22 includes a photo detector such as a photomultiplier or a photoconductive detector.

The measurement of the surface shape of the golf ball 16 through use of the apparatus according to the present embodiment is performed as follows. First, the light generation section 20 is caused to radiate laser light 18 onto the surface of the golf ball 16 at a predetermined position (e.g., a predetermined position within a dimple). Reflection light 24 of the laser light 18 is received by means of the light reception section 22. At this time, the drive means is operated to move the movable table 12 in the X and Y directions such that the position of the golf ball 16 is adjusted so as to allow the light reception section 22 to receive the reflection light 24 of the laser light 18. Subsequently, there is detected the positional relationship among the light generation section 20, the laser light radiated position on the surface of the golf ball 16, and the light reception section 22 (position relationship detection process).

More specifically, the movable table 12 is moved by use of the drive means until the light reception section 22 receives the reflection light 24, and the amounts of movement of the movable table 12 in the X and Y directions are detected by use of the movement amount detection means. Based on the thus-detected movement amounts, the positional relationship among the light generation section 20, the laser light radiated position on the surface of the golf ball 16, and the light reception section 22 is detected.

In the apparatus of the present embodiment, the above-described positional relationship detection process is repeated at a plurality of positions on the surface of the golf ball 16, and variation in the relative radial position of the surface of the golf ball 16 is determined based on a plurality of positional relationships thus obtained. That is, when the laser light radiated position on the surface of the golf ball detected in a first positional relationship detection process is compared with the laser light radiated position on the surface of the golf ball detected in a subsequent positional relationship detection process, there can be determined relative variation in the radial direction of the surface of the golf ball. In the apparatus of the present embodiment, the positional relationship detection process is performed at a plurality of positions on the surface of the golf ball, and the above-described comparison is performed a plurality of times. Thus, variation in the relative radial position of the surface of the golf ball 16 is determined within a predetermined area. Further, a variation in the radial position exceeding the measurable range of the light reception section 22 can be measured through movement of the movable table 12 in the Z direction by use of the drive means.

In the apparatus of the present embodiment, the reflection angle $\theta$ of the laser light 18 on the golf ball 16 is preferably set to fall within the range of 9–120°, more preferably within the range of 45–90° from the viewpoint of more accurate measurement. In this case, the angle $\theta$ is determined from the positional relationship among the light generation section 20, the golf ball 16, and the light reception section 22. Therefore, the reflection angle $\theta$ is substantially constant while the surface shape of the golf ball 16 is measured. Also, in the apparatus of the present embodiment, in order to increase the measurement accuracy, the laser light 18 preferably has a beam diameter of 1–10 $\mu$m.

Figure 2:
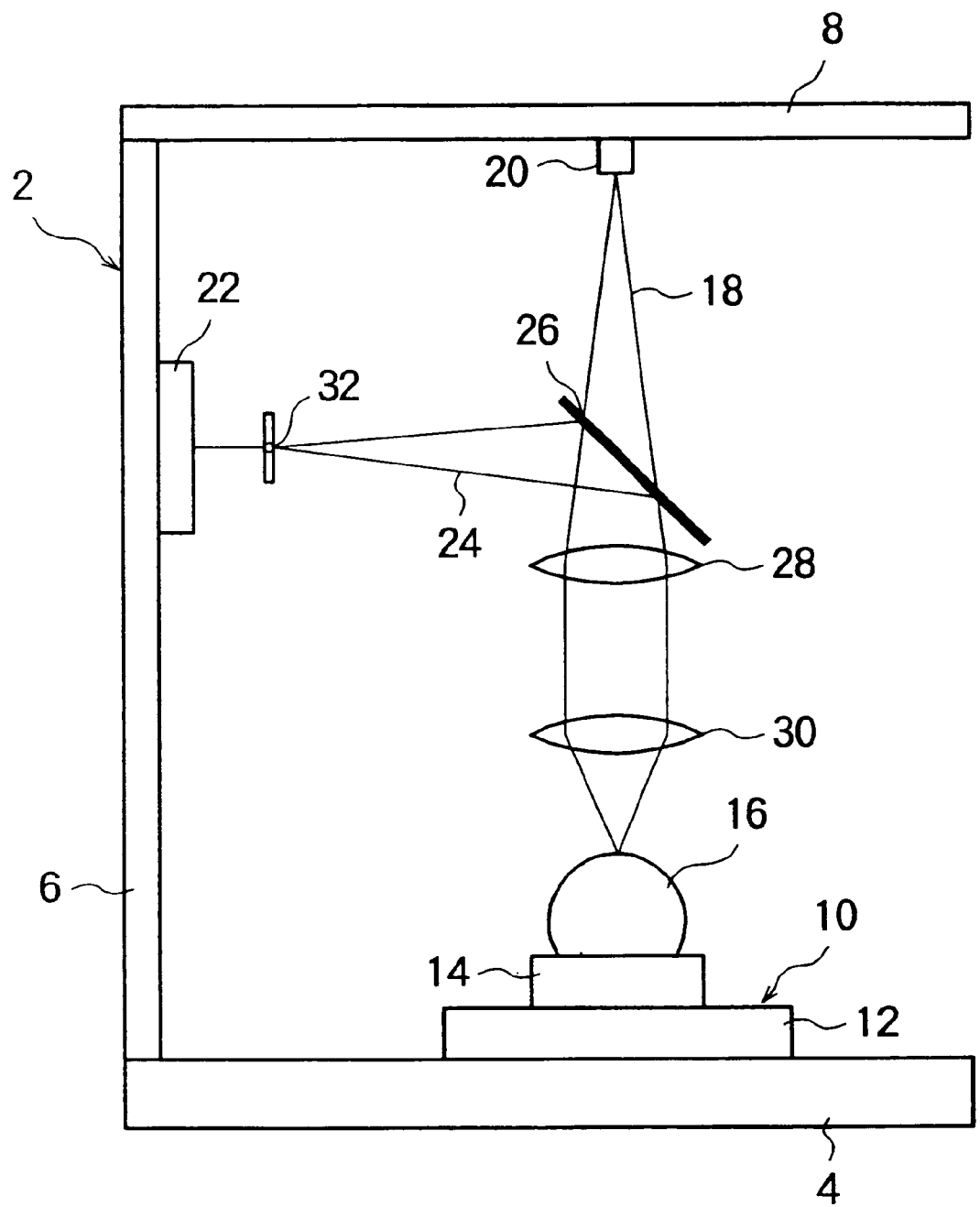
FIG. 2 is a side view of a second embodiment of the apparatus for measuring the surface shape of a golf ball according to the present invention.

Second Embodiment:

FIG. 2 is a side view showing a second embodiment of an apparatus for measuring the surface shape of a golf ball according to the present invention. This apparatus utilizes a conjugate focal point measurement method in order to detect the positional relationship among a light generation section, a laser light radiated position on the surface of a golf ball, and a light reception section. Since the base 2, the support means 10, and the golf ball 16 used in the present embodiment are the same as those used in the first embodiment, the components shown in FIG. 2 that have the same structures as those in FIG. 1 are denoted through use of common reference symbols, and their descriptions will be omitted.

In the apparatus of the present embodiment, the light generation section 20 is disposed on the third frame 8 of the base 2. Laser light 18 emitted from the light generation section 20 is radiated onto the surface of the golf ball 16 at a predetermined position via a half mirror 26, a collimator lens 28, and an objective lens 30. The half mirror 26 is disposed to incline at a predetermined angle (e.g., 45°) with respect to the traveling direction of the laser light 18. The collimator lens 28 collimates the laser light 18. The objective lens 30 focuses the laser light 18 on the surface of the golf ball 16. Reflection light 24 of the laser beam 18 passes through the objective lens 30 and the collimator lens 28 and is reflected sideward (rearward) by the half mirror 26. Subsequently, the reflected light 24 passes through a pinhole 32 and reaches the light reception section 22. The light generation section 20 includes a light emitting device such as a semiconductor laser, while the light reception section 22 includes a photo detector such as a photomultiplier or a photoconductive detector.

The measurement of the surface shape of the golf ball 16 through use of the apparatus according to the present embodiment is performed as follows. First, after successively passing through the half mirror 26, the collimator lens 28, and the objective lens 30, the laser light 18 from the light generation section 20 reaches and irradiates the surface of the golf ball 16 at a predetermined position (e.g., a predetermined position within a dimple). In this case, the laser light 18 converges into a small spot on the golf ball 16 when the objective lens 30 is mechanically moved in the vertical direction. Further, the reflection light 24 is received by means of the light reception section 22 after being passed through the objective lens 30 and the collimator lens 28 and reflected by the half mirror 26. At this time, the drive means is operated to move the movable table 12 in the X and Y directions such that the position of the golf ball 16 is adjusted so as to allow the light reception section 22 to receive the reflection light 24 of the laser light 18 through the pinhole 32. Subsequently, there is detected the positional relationship among the light generation section 20, the laser light radiated position on the surface of the golf ball 16, and the light reception section 22.

More specifically, the movable table 12 is moved by use of the drive means until the light reception section 22 receives the reflection light 24, and the amounts of movement of the movable table 12 in the X and Y directions are detected by use of the movement amount detection means. Based on the thus-detected movement amounts, the positional relationship among the light generation section 20, the laser light radiated position on the surface of the golf ball 16, and the light reception section 22 is detected. Further, a variation in the radial position exceeding the measurable range of the light reception section 22 can be measured through movement of the movable table 12 in the Z direction by use of the drive means.

Since the laser light 18 emitted from the light generation portion 20 is converged into a single point on the surface of the golf ball 16 at a predetermined position to be measured, the reflection light 24 passes through the pinhole 32 and reaches the light reception section 22. However, when the position of a portion to be measured changes in the Z direction (vertical direction), the reflection light 24 is not focused at the position of the pinhole 32 and becomes fuzzy. In this case, most of the light cannot pass through the pinhole 32, and therefore only a small amount of light reaches the light reception section 22, so that the light cannot be sensed as a light reception signal. In such a case, the objective lens 30 is moved mechanically, and there is detected the position of the objective lens 30 at which the laser light 18 passes through the pinhole 32. Based on the thus-detected position of the objective lens 30, the Z-direction coordinate (height) of the portion to be measured can be measured.

Further, in the apparatus of the present embodiment, the above-described positional relationship detection process is repeated at a plurality of positions on the surface of the golf ball 16, and variation in the relative radial position of the surface of the golf ball 16 is determined based on a plurality of positional relationships thus obtained. This operation is the same as that described in relation to the first embodiment.

EXAMPLES

Figure 3:
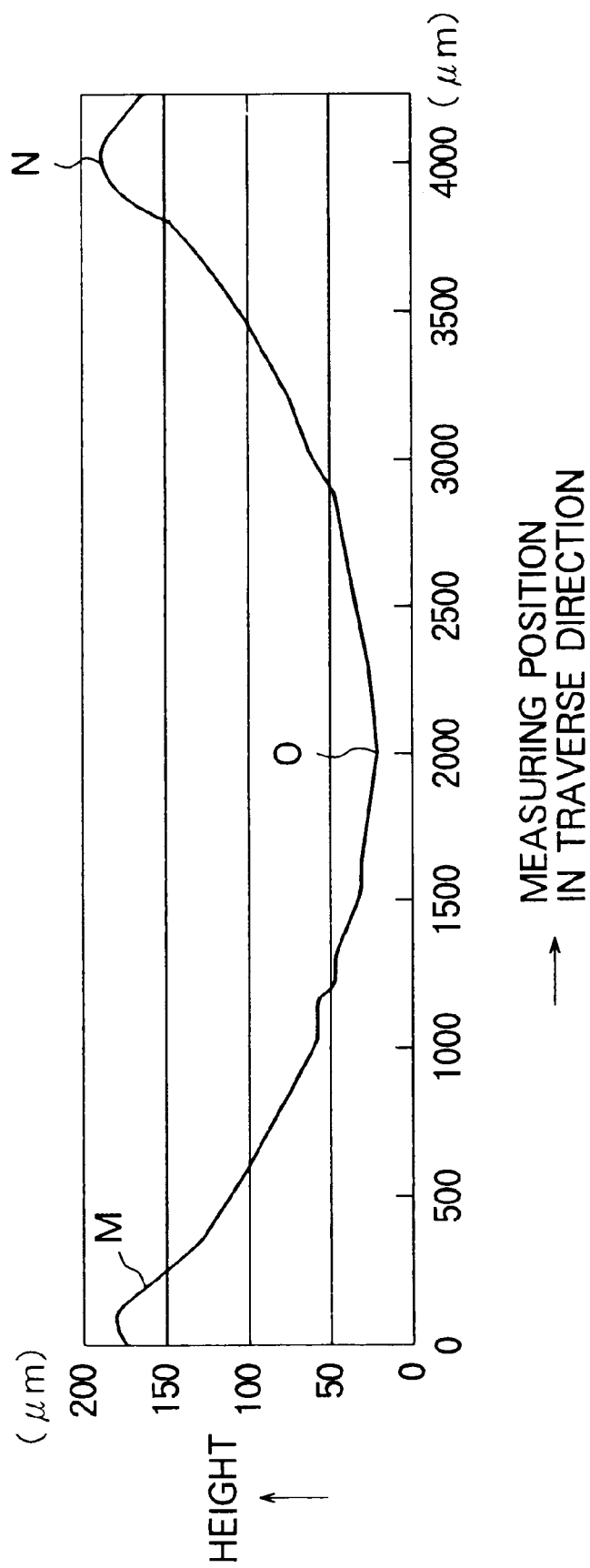
FIG. 3 is a graph showing the surface shape of a golf ball measured through use of the apparatus of the first embodiment.

The surface shape of a golf ball was measured through use of the apparatus of the first embodiment which operates in accordance with the angular reflection measurement method (see FIG. 3). In this case, the positional relationship detection process was performed at 1000 points along a straight line traversing a dimple while passing through the center point O thereof, from the vicinity of one end M to the vicinity of the other end N of the dimple. A variation in the relative height (radial position) of the surface of the dimple was determined based on the results of the measurement. The thus determined variation is shown in the graph of FIG. 3.

Figure 4:
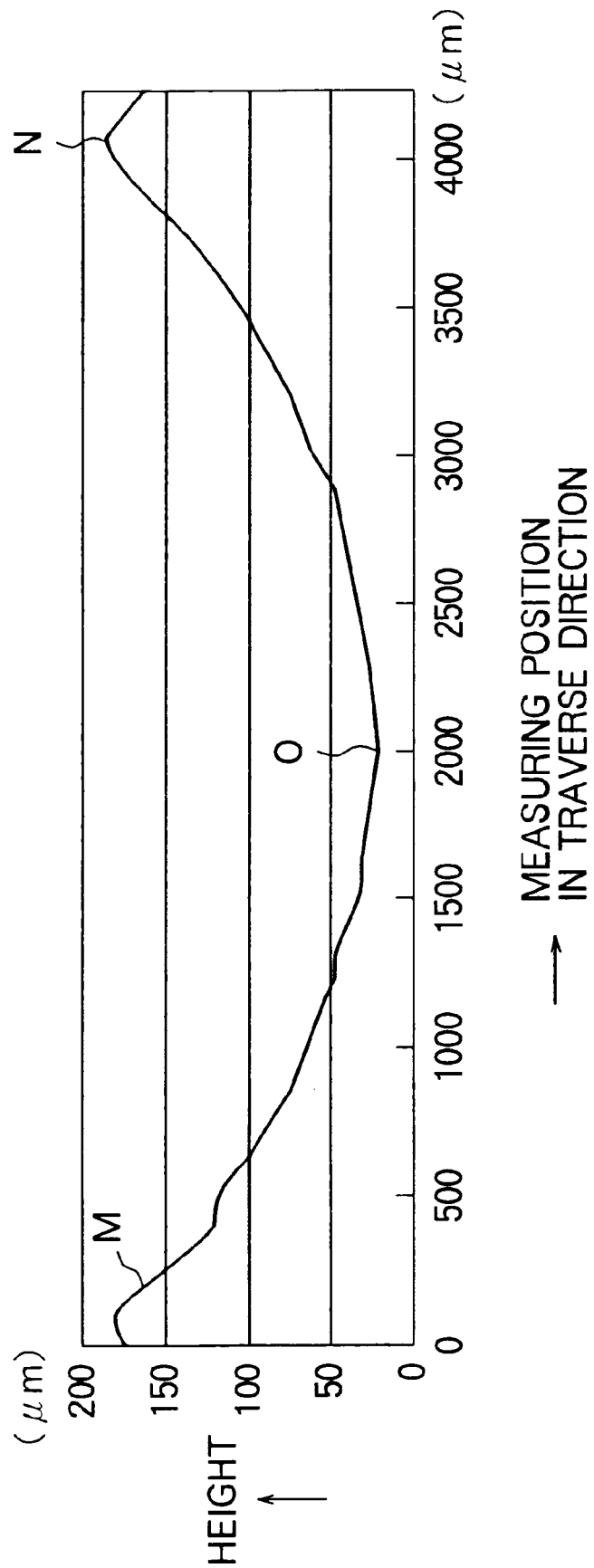
FIG. 4 is a graph showing the surface shape of a golf ball measured in accordance with a conventional method in which light from a lamp is used.

Separately, the surface shape of a golf ball was measured in accordance with a conventional method (see FIG. 4). That is, light radiated from a lamp and passed through a slit was radiated onto a dimple such that the line-shaped light extended along a straight line traversing a dimple while passing through the center point O thereof. The image of the radiated portion was captured through use of a camera, and the depth of the dimple was measured from the thus-obtained image. In this case the image was divided into 1000 sections from the vicinity of one end M to the vicinity of the other end N of the dimple, and the depth of the dimple was measured at each of the divided sections. The results of the measurement are shown in the graph of FIG. 4.

When the graph of FIG. 3 showing the results of the measurement performed according to the present invention is compared with the graph of FIG. 4 showing the results of the measurement performed according to the conventional method, it is understood that the cross-sectional shape of a dimple shown in FIG. 3 that was drawn as the result of the measurement performed according to the present invention is smooth and that therefore the measurement accuracy is considerably high.

Figure 5:
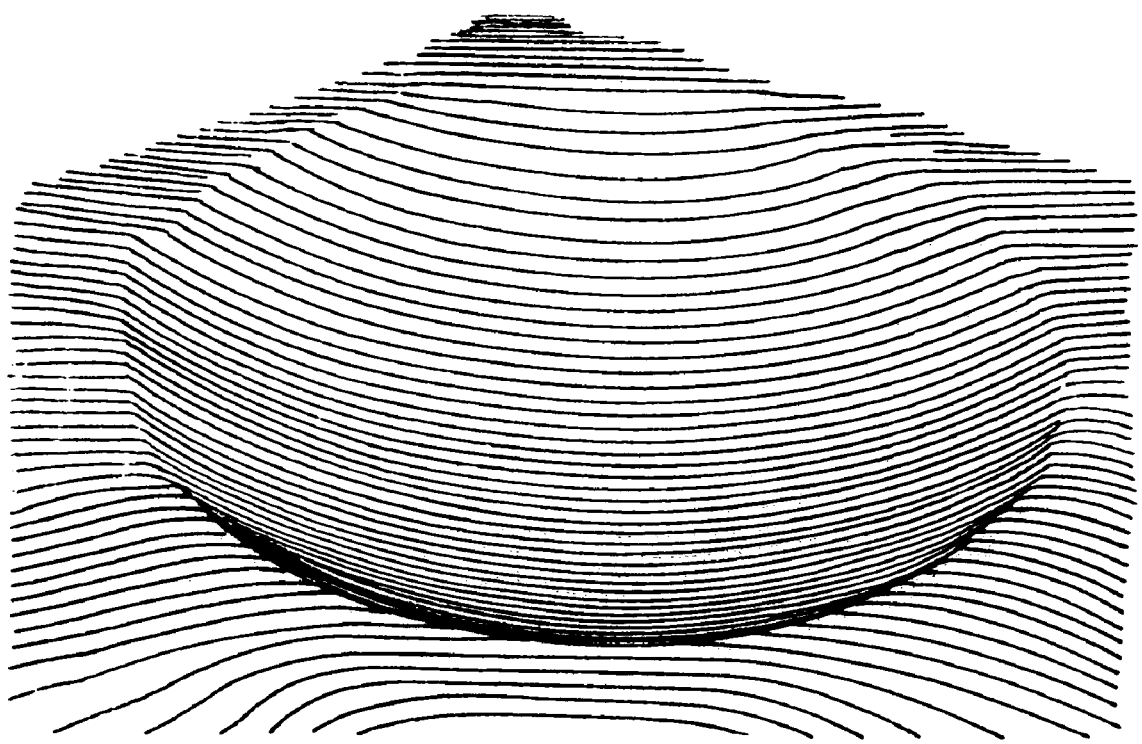
FIG. 5 is a stereogram showing the surface shape of a golf ball measured through use of the apparatus of the first embodiment.

Also, the above-describe measurement was performed at 100 points (at 100 cross sections) along the Y axis perpendicular to the X axis which corresponds to the horizontal axis of the graph shown in FIG. 3. From this measurement, there was obtained the stereogram (corresponding to the perspective view) shown in FIG. 5 that represents the shape of the dimple.

What is claimed is:

1. A method of measuring the surface shape of a golf ball, comprising the steps of:

(a) radiating laser light from a light generation section onto a surface of a golf ball at a predetermined position;

(b) receiving, through use of a light reception section, reflection light of the laser light reflected at the predetermined position on the surface of the golf ball;

(c) detecting the positional relationship among the light generation section, the laser light radiated position on the surface of the golf ball, and the light reception section;

(d) repeating the steps (a)–(c), as a positional relationship detection process, at a plurality of positions on the surface of the golf ball;

(e) determining variation in the relative radial position of the surface of the golf ball based on a plurality of positional relationships thus obtained.

2. A measuring method according to claim 1, wherein the laser light has a wavelength of 100–2000 nm.

3. A measuring method according to claim 1, wherein the positional relationship detection process is performed at 800–5000 points along a direction traversing a dimple in order to determine variation in the relative radial position of the surface of the dimple.

4. A measuring method according to claim 1, wherein the reflection angle θ of the laser light on the golf ball is set to fall within the range of 9–120°.

5. A measuring method according to claim 1, wherein the laser light has a beam diameter of 1–10 μm.

6. An apparatus for measuring the surface shape of a golf ball including support means for supporting a golf ball; a light generation section for radiating laser light onto the surface of the golf ball supported on the support means; and a light reception section for receiving reflection light of the laser light reflected at the surface of the golf ball, in which a positional relationship detection process is performed by radiating laser light from the light generation section onto the surface of the golf ball at a predetermined position and receiving, through use of the light reception section, reflection light of the laser light reflected at the predetermined position on the surface of the golf ball in order to detect the positional relationship among the light generation section, the laser light radiated position on the surface of the golf ball, and the light reception section; the positional relationship detection process is repeated at a plurality of positions on the surface of the golf ball; and variation in the relative radial position of the surface of the golf ball is determined based on a plurality of positional relationships thus obtained.

7. A measuring apparatus according to claim 6, wherein the support means is movable.

8. A measuring apparatus according to claim 7, wherein the support means is movable in the left/right direction (X direction), the front/back direction (Y direction), and the vertical direction (Z direction).

9. A measuring apparatus according to claim 7, wherein the amount of movement of the support means is detected by means of movement amount detection means.

* * * * *